Patented June 9, 1925.

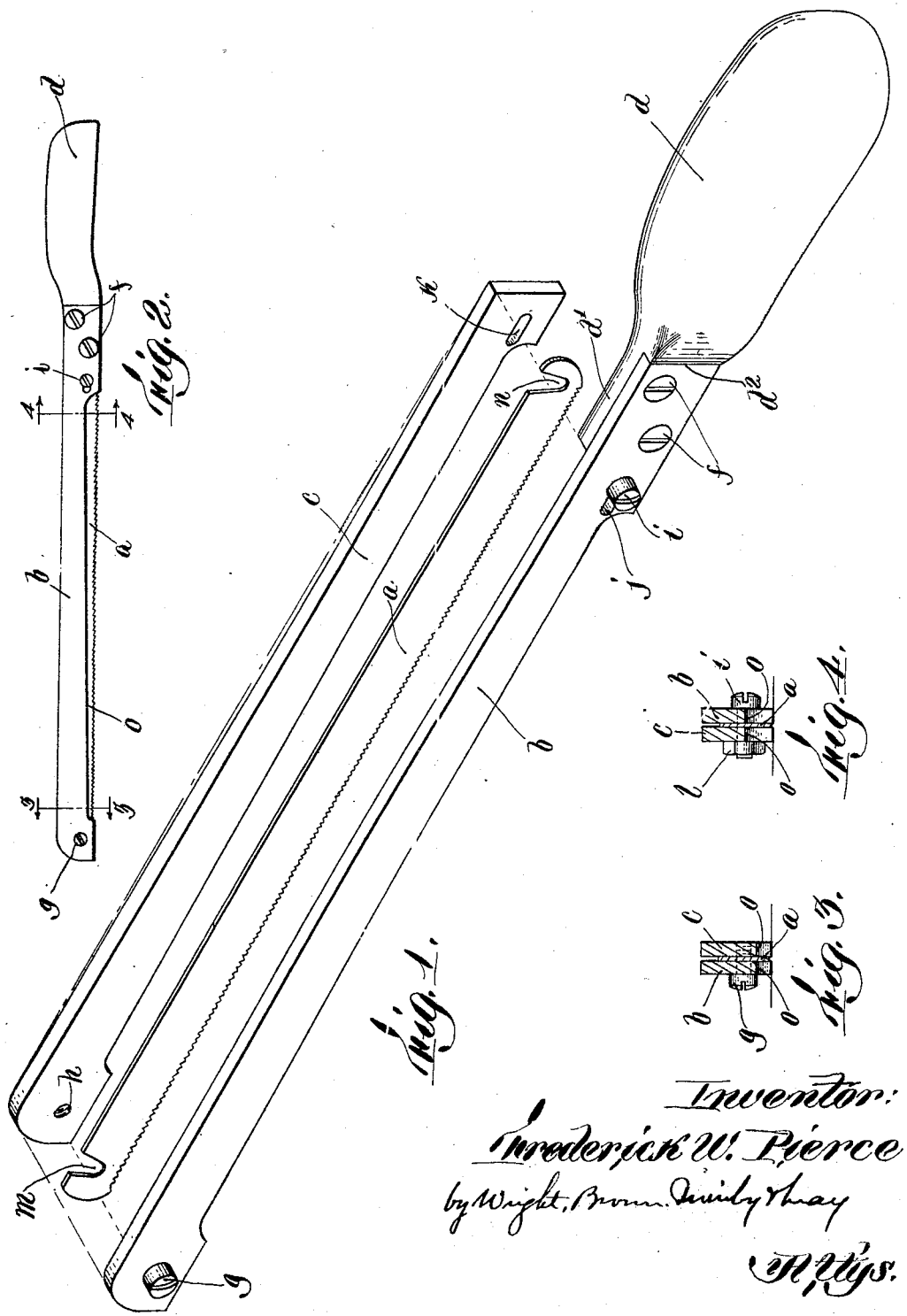

1,541,384

UNITED STATES PATENT OFFICE.

FREDERICK W. PIERCE, OF SOMERVILLE, MASSACHUSETTS, ASSIGNOR TO FREDERICK W. PIERCE AND BURT H. MACY, COPARTNERS, DOING BUSINESS AS THE-B-X-SAW COMPANY, OF BOSTON, MASSACHUSETTS.

HACK SAW.

Application filed June 6, 1923. Serial No. 643,616.

*To all whom it may concern:*

Be it known that I, FREDERICK W. PIERCE, a citizen of the United States, residing at Somerville, in the county of Middlesex and State of Massachusetts, have invented new and useful Improvements in Hack Saws, of which the following is a specification.

The present invention relates to hack saws, the constituent elements of which are a holder and a detachable blade, and has for its objects to provide means for effecting easy and rapid attachment and detachment of the blade with and from the holder, to effect at the same time a secure attachment of the blade with the holder not merely at the ends, but throughout its length as well, to enable the holder to take different blades, varying somewhat in length, and to secure such different blades equally firmly without the aid of tension devices to limit the depth of cut possible with the saw, and, in connection with such limitation, to permit cutting to different limits of depth without any intermediate adjustment of the blade, and otherwise to improve the construction and useful qualities of such tools.

The manner in which these objects are accomplished is explained in connection with the detailed description of the preferred form of my invention contained in the following specification with reference to the drawings.

In the drawings,—

Figure 1 is a perspective view on a large scale of the several parts of my improved hack saw, detached and separate from one another but in approximately the relative positions which they occupy when assembled.

Figure 2 is a side elevation of the assembled saw, shown on a smaller scale.

Figures 3 and 4 are cross sections on approximately the scale of Figure 1, taken on the lines 3—3 and 4—4 respectively of Figure 2.

Like reference characters designate the same parts wherever they occur in all the figures.

The saw comprises a detachable blade $a$ and a holder; the holder consists of two parts $b$ and $c$, which are preferably bars of sufficiently strong and rigid material and form. Steel is a suitable, and indeed the best, material for these members. A handle $d$ is connected with one of the members, as $b$; and while it may be integral therewith, it is preferably made as a separate piece for the sake of economy. Thus while the bars may be made of rolled stock hardened and tempered so as to have the necessary strength and elasticity, the handle may be made of cast iron or any other suitable material and in a form which enables it to be firmly and comfortably grasped by the user. Connection between the handle and bar $b$ is made by providing the handle with an extension $d'$ which overlaps one end of the bar and is secured thereto by screws $f$ or other suitable fastenings. The handle is also formed with a shoulder $d^2$ besides the extension $d'$ against which the complementally formed end of the attached bar may abut in order to increase the rigidity of the connection between the bar and handle.

The bar $c$ is of similar outline to the bar $b$ but is shorter by an amount substantially equal to the length of the extension $d'$, whereby it can be laid against the other bar, with the blade between them, and made fast by connections at opposite ends. The connection at one end, preferably that remote from the handle, is made by a screw $g$ which is passed through a hole in the bar $b$, in which its shank may be turned freely, and is threaded into a tapped hole $h$ in the bar $c$. The other fastening is a screw $i$ which passes through slots $j$ and $k$ in the two bars and receives a nut $l$ on the end which protrudes from bar $c$. Slots are provided in this manner for the fastening at one end in order that the variations which occur unavoidably, in the course of manufacture, in the lengths and distances between the apertures of blades put out commercially as of approximately the same dimensions, may be accommodated without difficulty.

One of the valuable and important novel features of this invention is that the blade, instead of being formed with enclosed holes at its opposite ends to receive the fastenings, as has been heretofore usual in hack saw construction, is formed with notches $m$ and $n$ open through the back edge of the blade, that is, the edge opposite to the toothed edge, and are wide enough to receive the screws by lateral insertion, whereby the blade may be assembled with the holder by loosening the fasteners but without removing them from the holder. Preferably, also, the mouths of the notches are widened to assist in finding the fasteners when being assembled.

Another improvement, which makes possible the use of a saw blade having notches of the sort described, is embodied in the holder itself and consists in the fact that either or both of the side bars, but preferably both, may be slightly bowed or cambered lengthwise. The character and approximate amount of this cambered formation is shown in Figure 1 by reference to the broken lines, which represent straight lines between the ends of the bars. The curvature is such that, when the holder is assembled, the convex sides of the bars are adjacent to one another. It follows from this construction and arrangement that when the blade is inserted between the bars and the latter are drawn together by setting up the connecting screws, the pressure of the bars against the blade is exerted more or less along the length of the latter, whereby the blade is held firmly, not merely at the points where direct clamping pressure is exerted by the fasteners, but at intermediate points as well. By making the bars of spring tempered stock and with the proper amount of camber, as much gripping pressure may be exerted throughout the whole length of the blade, or at any selected point or points, as may be necessary for any use to which the saw is put, and the gripping effect is not confined wholly to the ends of the blade.

The side bars of the holder also serve as gauges to limit the depth of cut possible to be made. This effect is indicated in Figure 1 by the cutting back of the lower edges of the side bars, but it is more definitely shown in Figure 2. The edge of the bar $b$ which serves as the gauge is there designated by the letter $o$ and it is to be understood that the other bar $c$ is or may be of the same character and form as to its lower edge. These stop shoulders or gauging edges are square to the sides of the blade and preferably extend through the full thickness of the bars, as shown in the sectional views Figures 3 and 4. It will be noted in Figure 2 also that the gauge or stop shoulder formed by the lower edge of the bar is nearer the toothed edge of the blade at the outer end of the saw, and farther from the saw teeth at the inner end; using the terms "inner" and "outer" here with reference to their distances from the handle. Preferably also the gauge stop is formed with a continuous inclination from its shallowest to its deepest part, although this is a detail which may be modified; or the parts of different depths may be more or less nearly parallel with the toothed edge of the saw as far as they extend, and separated from one another by distinct shoulders. A further variation in the depth to which the saw may cut, is effected by adjustment of the saw blade in the holder to place its toothed edge at a greater or less distance from the gauge shoulders. Such an adjustment is made possible by the open notches $m$ of the blade; and this is another advantage which arises from that feature of the invention.

A saw as thus constructed is especially designed and adapted for the service of cutting armored insulated wire and cable; that is, that construction of wire and cable used for electrical purposes which is embedded and covered with insulating material and then externally covered with flexible metallic armor made of a strip of galvanized iron, or the like, coiled helically around it and having overlapping edges. Electricians when installing such armored wire in buildings have difficulty in cutting it to the proper lengths, and particularly without at the same time destroying the insulation of the enclosed conductors.

If, when the electrician is installing such conductors he needs to cut them, it is a waste of his time if he has to carry the conductor to some more or less distant point where there is a bench and proper tools. It is much more economical of his time if he can be equipped to cut the wire on the spot where, in the course of installing it, he finds it necessary to sever it. But with the tools heretofore used this has been a difficult proceeding because, lacking a bench and a vise to hold the wire, the flexible character of the armor causes it to bind and grip the blade of the ordinary hack saw and break it. Then, if the electrician succeeds in cutting through the armor, the lack of any protection on the ordinary hack saw gives rise to the danger of cutting through the soft insulation on the wire and either cutting the latter also or making a short circuit. Usually when such a wire is cut, it is necessary to leave a part of the insulated wire projecting from the armor, wherefore the severance of the armor and of the wire must take place at different points.

The saw just described overcomes these difficulties. The rigid manner in which the blade is held, for it is not only clamped at both ends, but is gripped at numerous points between the ends as well, and this prevents vibrations from being set up in the blade by the sawing action, prevents it from being broken if seized by the armor in the course of cutting, and this relieves the workman of having any care for the blade. He can place the armored wire across his knee and use all the strength needed to cut through the armor and can complete a cut in a very brief time, since the blade is practically unbreakable in its mounting. There is no danger of cutting through the insulation because, in making this cut, he uses that part of the saw where the stop shoulder $o$ is nearest to the teeth of the blade, and there the depth of the cut is limited to less than the depth of the insulation from the armor. But when it is necessary to cut through the wire as well, he uses that part of the saw where the stop is farther back from the teeth and by which he can cut through the insulation and the embedded wire.

This capacity of the same tool for cutting both the armor and the wire reduces the equipment which the workman needs to carry, and enables him to do with the saw what he would otherwise require cutting pliers in addition to accomplish. Also, the construction of the saw, with the side bars close to the toothed edge, both keeps the saw from jumping off from the cut and protects the operator's hands. Also the saw can be used in narrow spaces as in cutting off old wiring from closets, outlet boxes, switch boxes, etc.

The saw is useful as well for cutting flexible metallic conduit, the various makes of which are made substantially the same as the metallic armor of the corresponding makes of armored wires and cables. Hence, for the purposes of this specification and the protection which I claim the term "armored conductor" is intended to include also conduits for electrical purposes, whether occupied or not by insulated conductors.

What I claim and desire to secure by Letters Patent is:

1. An armored wire cutting tool comprising a blade having teeth on one edge and a holder having side bars constructed to bear flatwise against the side of the blade and grip said blade throughout its length, said bars being cut away at one edge to expose the toothed edge of the blade and said cut away edges being formed as stop shoulders projecting from the sides of the blade at right angles thereto.

2. An armored wire cutting tool comprising a blade having teeth on one edge and a holder having side bars constructed to grip said blade throughout its length, said bars being cut away at one edge to expose the toothed edge of the blade and said cut away edges being formed as stop shoulders projecting from the sides of the blade at right angles thereto and at a distance back from said toothed edge substantially equal to the thickness of the armor for at least a part of the length of the blade.

3. An armored wire cutting tool comprising a blade having teeth on one edge and a holder having side bars constructed to grip said blade throughout its length, said bars being cut away at one edge to expose the toothed edge of the blade and said cut away edges being formed as stop shoulders projecting from the sides of the blade at right angles thereto and at a distance back from said toothed edge substantially equal to the thickness of the armor for a part only of the length of the blade and being at a greater distance back from such toothed edge throughout another part of the length of the blade.

4. An armored wire cutting tool consisting of a blade having saw teeth on one edge, side bars arranged on opposite sides of said blade, and fastening means engaged with said bars adjacent to the ends of the blade for drawing the bars into clamping relation to the blade, one of the side bars being bowed or cambered toward the other whereby to exert gripping pressure against the blade in the intermediate part as well as at the ends thereof.

5. A hack saw consisting of a saw blade having notches near its opposite ends opening through its back edge, and a holder consisting of side bars and fasteners passing from one such bar to the other and adapted to draw them together, the blade being adapted for insertion between the bars and the bars having faces which bear flatwise against the blade and grip it when so drawn together, its notches being spaced so as to pass over said fasteners when so assembled.

6. A hack saw comprising a bar having a handle at one end, a complemental bar lying beside the first named bar, one of said bars being convex between its ends toward the other, fastening devices engaged with said bars adjacent to the ends of the latter for drawing them together, and a saw blade between said bars with its side faces in contact with the adjacent faces of the bars and gripped thereby, said fastening devices being arranged to exert force on the bars for the purpose set forth in lines which pass across the blade between the toothed edge and the back edge thereof, and the said convex formation of one of the bars causing the blade to be so gripped throughout its length.

7. A hack saw comprising a bar having a handle at one end, a complemental bar adapted to be placed beside the first named bar, one of said bars being convex between its ends toward the other, fastening screws passing through and engaged with said bars for drawing them together, and a saw blade adapted to be placed between said bars and gripped thereby said blade having openings intermediate its toothed edge and its back through which said screws pass and the said convex formation of one of the bars causing the blade to be so gripped throughout its length, both bars having their edges nearest to the toothed edge of the blade, made with a recessed formation so as to provide stop or gauge shoulders the surfaces of which are substantially at right angles to the adjacent faces of the blade.

8. A hack saw comprising a holder and a saw blade, the holder being formed of two side bars, one of which is longer than the other, and a handle, said handle being formed with an extension at one end overlapping one end of the longer bar and with a shoulder beside such extension against which the adjacent end of the bar may abut, the overlapping extension and end of the bar being secured together and the blade being detachably confined between said bars, combined with fasteners holding the bars together and causing them to grip the blade.

9. A hack saw comprising a toothed blade having fastener-receiving apertures near its ends, a holder provided with portions adapted to embrace the apertured parts of the blade, and fasteners arranged to pass through the apertures of the blade and being connected with the holder; the holder being formed with an elongated slot to receive one of said fasteners whereby to accommodate blades varying from one another as to the distance between their apertures.

10. A hack saw comprising a holder and a blade, said holder embracing the blade and bearing flatwise against opposite faces thereto and gripping it, both at the ends and at intermittent points, thereby preventing bending of the blade, the blade and holder having registering apertures at the ends of the blade, and a clamping means passing through said apertures and constituting the sole means for securing the holder and blade in gripping relation, one of said apertures in the holder being extended lengthwise of the blade whereby to adapt the clamping devices to different blades in which the apertures are at respectively different distances apart.

In testimony whereof I have affixed my signature.

FREDERICK W. PIERCE.